(12) United States Patent
King et al.

(10) Patent No.: US 7,683,757 B2
(45) Date of Patent: Mar. 23, 2010

(54) MULTI-ANTENNA SYSTEM AND METHOD FOR REMOTELY CONTROLLING A FUNCTION

(75) Inventors: Ronald O. King, Brownstone, MI (US); Art Turovsky, Southfield, MI (US); Tom Q. Tang, Novi, MI (US)

(73) Assignee: Lear Corporation, Southfield, MI (US)

( * ) Notice: Subject to any disclaimer, the term of this patent is extended or adjusted under 35 U.S.C. 154(b) by 700 days.

(21) Appl. No.: 11/163,416

(22) Filed: Oct. 18, 2005

(65) Prior Publication Data

US 2007/0085658 A1   Apr. 19, 2007

(51) Int. Cl.
*B60R 25/00* (2006.01)

(52) U.S. Cl. .................. 340/5.72; 455/13.3; 455/277.2; 455/99; 342/432; 342/445

(58) Field of Classification Search ................ 340/5.72; 455/99; 342/432, 445
See application file for complete search history.

(56) References Cited

U.S. PATENT DOCUMENTS

| | | | | |
|---|---|---|---|---|
| 2,886,796 | A * | 5/1959 | Wallace | 340/961 |
| 5,381,444 | A * | 1/1995 | Tajima | 375/141 |
| 5,617,102 | A * | 4/1997 | Prater | 342/374 |
| 5,661,762 | A * | 8/1997 | Petranovich et al. | 375/347 |
| 5,937,065 | A * | 8/1999 | Simon et al. | 380/262 |
| 6,101,428 | A * | 8/2000 | Snyder | 701/2 |
| 6,292,107 | B1 | 9/2001 | Yamaura et al. | |
| 6,480,722 | B1 * | 11/2002 | Takada et al. | 455/501 |
| 6,573,838 | B2 | 6/2003 | Christie | |
| 6,906,669 | B2 | 6/2005 | Sabet et al. | |
| 6,907,094 | B2 * | 6/2005 | Matsui et al. | 375/347 |
| 6,944,465 | B2 * | 9/2005 | Spain et al. | 455/456.1 |
| 7,280,810 | B2 * | 10/2007 | Feher | 455/137 |
| 7,295,825 | B2 * | 11/2007 | Raddant | 455/277.1 |
| 7,313,391 | B2 * | 12/2007 | Gutowski | 455/423 |
| 2001/0038328 | A1 * | 11/2001 | King et al. | 340/5.64 |
| 2003/0122701 | A1 * | 7/2003 | Tran | 342/29 |
| 2004/0033808 | A1 * | 2/2004 | Rorabaugh | 455/456.1 |
| 2004/0214642 | A1 * | 10/2004 | Beck | 463/40 |
| 2005/0168322 | A1 * | 8/2005 | Appenrodt et al. | 340/5.72 |
| 2006/0025090 | A1 * | 2/2006 | Shirakata et al. | 455/136 |

(Continued)

FOREIGN PATENT DOCUMENTS

DE      19736302      4/1998

(Continued)

OTHER PUBLICATIONS

JP 2000115042A Apr. 2000 Japanese Patent Ouchi,Koichi "Diversity Receiving Device".*

(Continued)

*Primary Examiner*—Daniel Wu
*Assistant Examiner*—Bradley E Thompson
(74) *Attorney, Agent, or Firm*—Brooks Kushman P.C.

(57) ABSTRACT

A system and method for remotely controlling a function. The system includes a transmitter and a receiver control circuit having a plurality of antennas. The transmitter transmits a wireless control signal having first and second signal portions. An antenna is selected based on the first signal portion. A function is performed when the second signal portion is received by the selected antenna and successfully decoded.

20 Claims, 3 Drawing Sheets

U.S. PATENT DOCUMENTS

| | | | |
|---|---|---|---|
| 2006/0114100 A1* | 6/2006 | Ghabra et al. | 340/5.61 |
| 2006/0114101 A1* | 6/2006 | Schambeck et al. | 340/5.61 |
| 2007/0008088 A1* | 1/2007 | Nantz et al. | 340/426.29 |
| 2007/0085658 A1* | 4/2007 | King et al. | 340/5.72 |
| 2007/0210896 A1* | 9/2007 | Schambeck et al. | 340/5.72 |
| 2007/0252029 A1* | 11/2007 | Karem | 244/1 R |
| 2008/0055116 A1* | 3/2008 | Luo et al. | 340/988 |

FOREIGN PATENT DOCUMENTS

| | | |
|---|---|---|
| DE | 100 64 141 A1 | 7/2002 |
| DE | 10 2004 052 904 A1 | 6/2006 |
| EP | 0 965 710 A3 | 8/2000 |
| EP | 1 455 314 A3 | 9/2005 |
| GB | 2 317 729 A | 4/1998 |
| JP | 2000115042 A * | 4/2000 |

OTHER PUBLICATIONS

German Office Action from the German Patent & Trademark Office mailed Jan. 28, 2008 for the corresponding German patent application 10 2006 043 141.3-35.

* cited by examiner

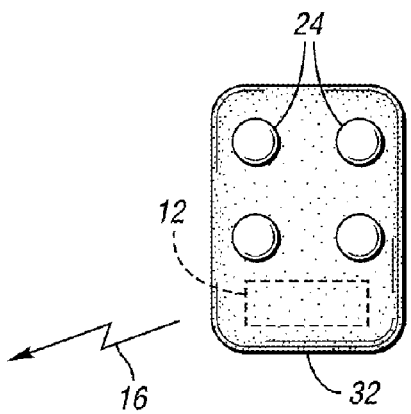
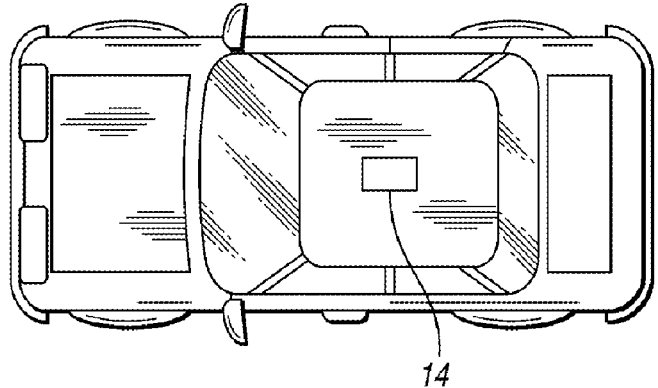
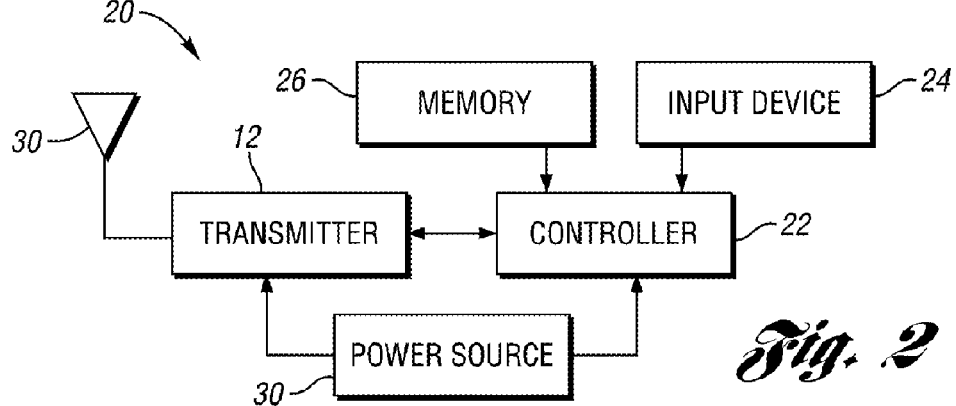
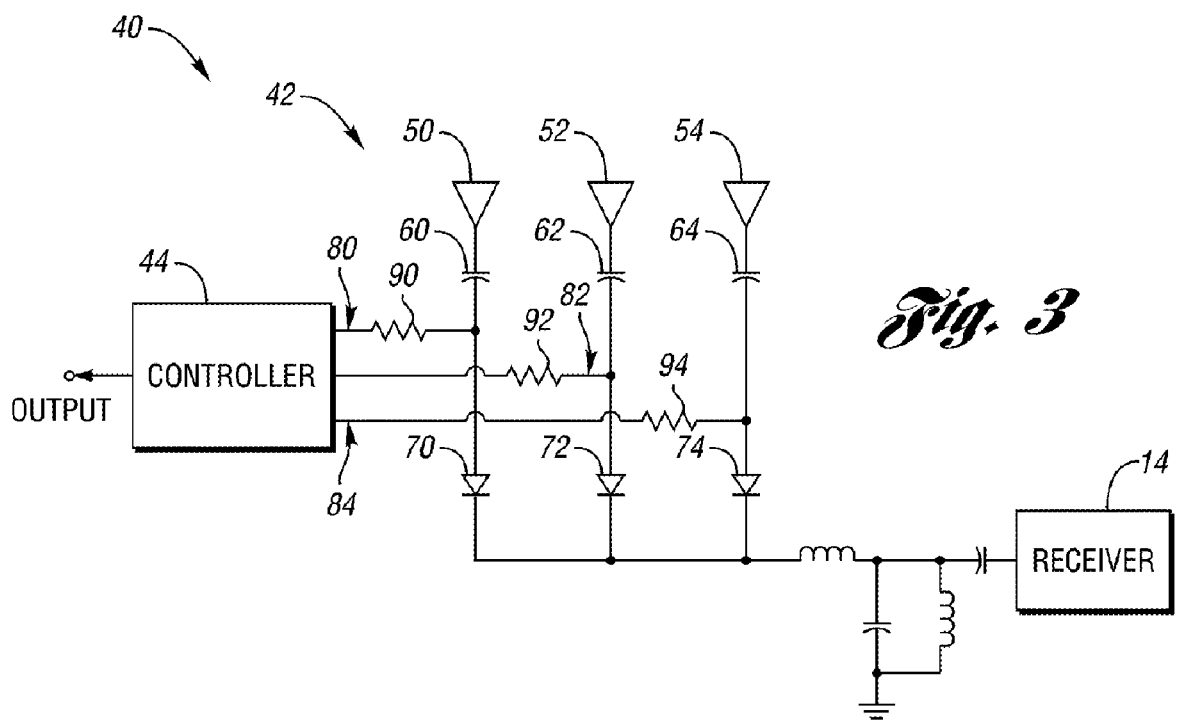

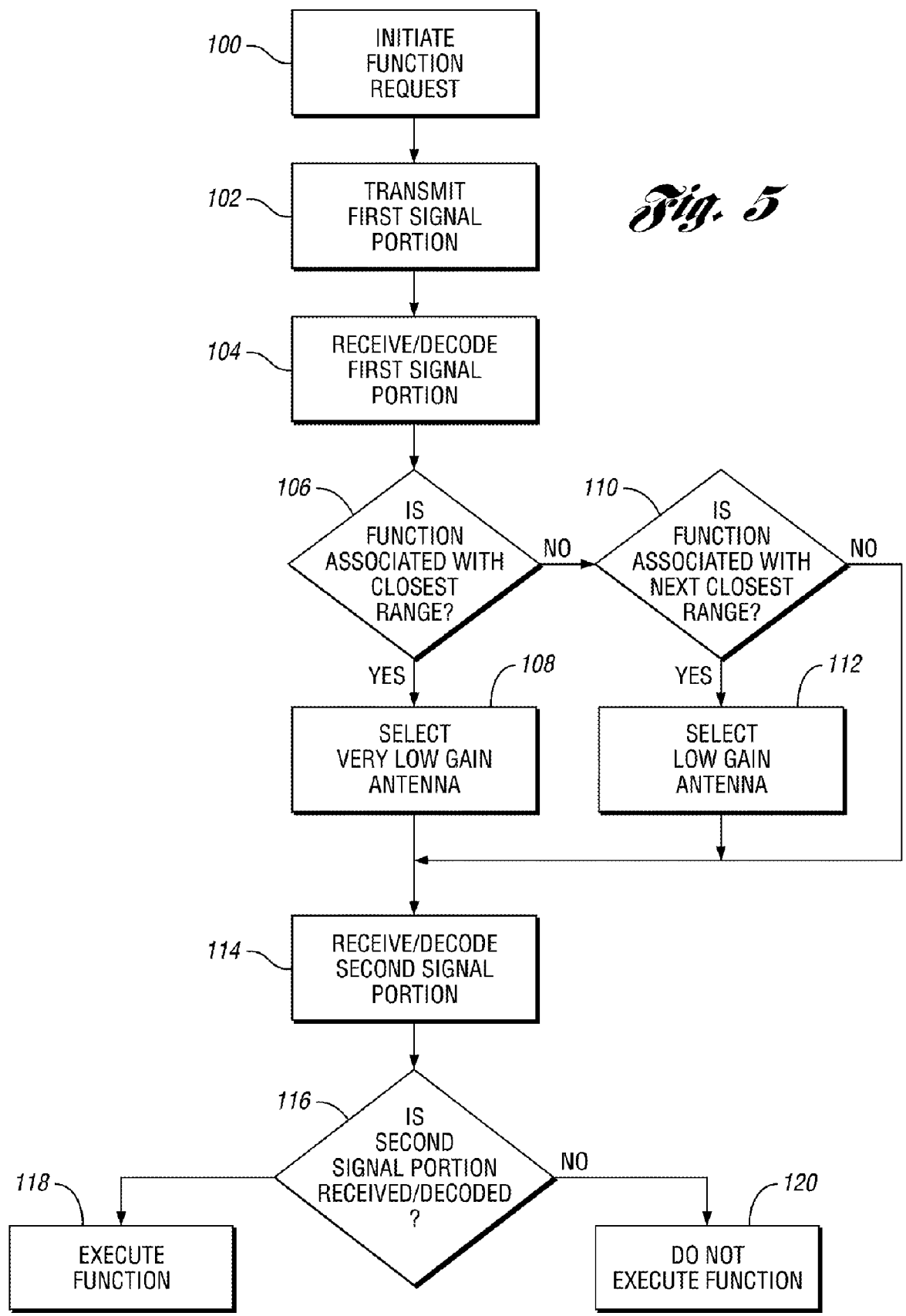

MULTI-ANTENNA SYSTEM AND METHOD FOR REMOTELY CONTROLLING A FUNCTION

BACKGROUND OF THE INVENTION

Field of the Invention

The present invention relates to a system and method for controlling a function, such as a vehicle function.

SUMMARY OF THE INVENTION

In at least one embodiment of the present invention, a system for remotely controlling a function is provided. The system includes a transmitter and a receiver control circuit. The transmitter transmits a wireless control signal having a first signal portion and a second signal portion. The first signal portion is indicative of a function request. The receiver control circuit has a first antenna, a second antenna, and a controller for selectively enabling and disabling the first and second antennas and decoding the wireless control signal. The first antenna receives the first signal portion. The controller enables the second antenna when the first signal portion is indicative of a function that is to be performed when the transmitter is within a first predetermined distance from the receiver. The function is performed when the second signal portion is received by the second antenna and successfully decoded.

In at least one other embodiment of the present invention, a method of controlling a function is provided. The method includes the steps of receiving a first signal portion with a first antenna, determining whether the first signal portion is indicative of a range-limited function, enabling a second antenna when the first signal portion is indicative of a range-limited function, and performing the range-limited function when the second signal portion is received by the second antenna and successfully decoded. The first antenna provides higher gain than the second antenna.

In at least one other embodiment, a method of controlling a vehicle function with a remote keyless entry system having a remote keyless entry fob having a transmitter and a vehicle-mounted receiver control circuit that includes first and second antennas, and a controller for selectively enabling and disabling the first and second antennas is provided. The method includes the steps of transmitting a wireless control signal having a first signal portion and a second signal portion with a transmitter, receiving the first signal portion with the first antenna, enabling the second antenna and disabling the first antenna when the first signal portion is indicative of a first function that is to be performed when the transmitter is within a first predetermined distance from the vehicle, and performing the first function when the second signal portion is received by the second antenna and successfully decoded. The first antenna provides higher gain than the second antenna.

BRIEF DESCRIPTION OF THE DRAWINGS

FIG. 1 is a schematic diagram of a system for remotely controlling a function according to one embodiment of the present invention.

FIG. 2 is a schematic diagram of a transmitter control circuit for generating a wireless electronic signal.

FIG. 3 is a schematic diagram of a receiver control circuit for receiving the wireless electronic signal.

FIG. 5 is a flowchart of a method for controlling a function according to one embodiment of the present invention.

DETAILED DESCRIPTION

Figure 4:
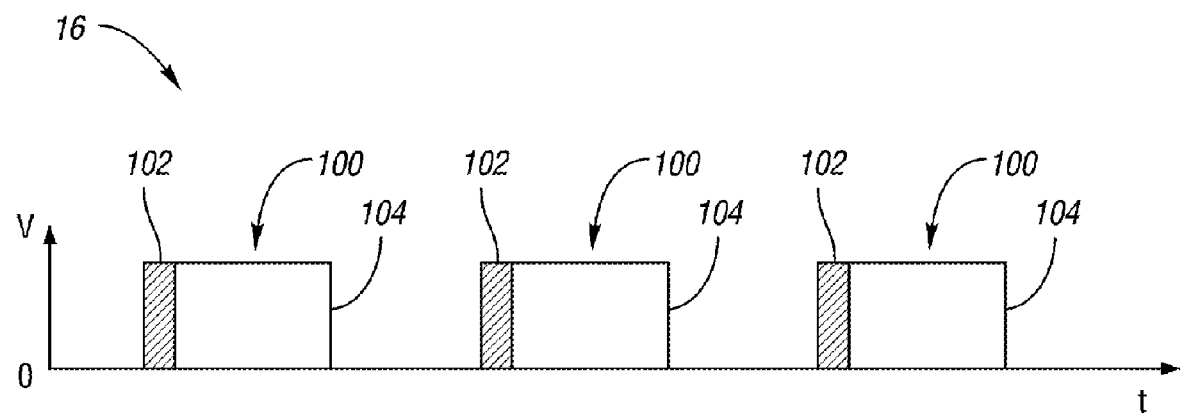
FIG. 4 is a simplified graphical representation of the wireless electronic signal.

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Referring to FIG. 1, a schematic diagram of a system 10 for remotely controlling a function is shown. In the embodiment shown, the system 10 is configured as a remote keyless entry system for a motor vehicle. Although the system 10 is primarily described in a vehicle context, it is contemplated that the invention may be implemented to control any appropriate function in connection with any appropriate system and/or device.

The system 10 may include a transmitter 12 and a receiver 14. The transmitter 12 may be remotely located from the receiver 14 and may be electronically coupled (i.e., in electronic communication) with the receiver 14 via a wireless electronic signal 16. Moreover, the transmitter 12 and receiver 14 may be configured for unidirectional or bidirectional communication.

The system 10 may be configured as an active or passive system. In an active system, an operator actuates an input device, such as a switch or button, to perform a desired function, such as locking or unlocking a vehicle door. In a passive system, actuation of an input device is not needed to perform a desired function. Instead, a function may be automatically performed as the transmitter 12 approaches or moves away from the receiver 14. For instance, in an embodiment having a vehicle-mounted receiver, a vehicle door may be automatically locked when the transmitter 12 is brought sufficiently close to the vehicle and may be automatically unlocked as the transmitter 12 moves away from the vehicle.

Referring to FIG. 2, an exemplary transmitter control circuit 20 is shown. The transmitter control circuit 20 may include the transmitter 12, a transmitter controller 22, at least one input device 24, a memory device 26, an antenna 28 for communicating the wireless control signal 16, and a power source 30 for powering one or more aspects of the transmitter control circuit 20.

The transmitter 12 may be any suitable electronic device capable of generating the wireless electronic signal 16, such as a transponder, transceiver, or the like. The transmitter 12 may generate the wireless electronic signal 16 at one or more power levels and at one or more frequencies or frequency deviations as will be discussed in more detail below. In the embodiment shown in FIG. 1, the transmitter 12 is part of a handheld remote control unit 32, commonly referred to as a "fob". Alternatively, the transmitter 12 may be part of an ignition key head or any other suitable remote control device.

The transmitter controller 22 may control the generation of the wireless control signal 16 by the transmitter 12. In an embodiment configured as an active system, the transmitter controller 22 may receive an input signal from one or more input devices 24 and facilitate the generation of a specific wireless control signal or a portion thereof based on the input signal.

Referring to FIG. 3, an exemplary receiver control circuit 40 is shown. The receiver control circuit 40 may include the receiver 14, an antenna circuit 42, a receiver controller 44 electronically coupled to the receiver 14, and a power source (not shown) for powering one or more aspects of the receiver control circuit 40.

The receiver 14 may be any suitable electronic device capable of receiving the wireless electronic signal 16 from the transmitter 12. For instance the receiver 14 may be configured as a transceiver or transponder. In at least one embodiment, the receiver 14 may receive the wireless electronic signal 16 via the antenna circuit 44 as will be described in more detail below. The transmitter 12 may be disposed on a vehicle and may be directly or indirectly electronically coupled to one or more systems or devices that may execute a function.

The antenna circuit 42 may include a plurality of antennas. In the embodiment shown in FIG. 3, a first antenna 50, second antenna 52, and a third antenna 54 are provided. Of course, the present invention contemplates embodiments having more antennas or fewer antennas. Each antenna is associated with a capacitor, a diode, and an antenna control line having a resistor. More specifically, the first, second, and third antennas 50,52,54 are associated with first, second, and third capacitors 60,62,64, first, second, and third diodes 70,72,74, and first, second, and third antenna control lines 80,82,84 having first, second and third resistors 90,92,94, respectively. As such, these components may be configured such that the first antenna 50 is a high gain antenna, the second antenna 52 is a low gain antenna, and the third antenna 54 is a very low gain antenna.

The receiver controller 44 may control decoding of the wireless control signal 16. More specifically, the receiver controller 44 may control the operation of the antennas 50,52, 54 via the antenna control lines 80,82,84 and may decode, demodulate, or decipher the wireless electronic signal 16 or a portion thereof so that a requested function may be determined. The receiver controller 44 may be electronically coupled to one or more systems or devices that may execute a function. For example, the receiver controller 44 may provide an output signal to one or more actuators or electronic devices to control execution of a function. In a vehicular context, these functions may include, but are not limited to actuating a window, actuating a vehicle closure (e.g., door or convertible top), actuating a locking mechanism for a vehicle closure like a door or trunk, and operating an ignition system, alarm system, and/or interior or exterior lights.

Referring to FIG. 4, a simplified representation of an exemplary wireless electronic signal 16 is shown. The wireless electronic signal 16 may include a message 100 that may be transmitted one or more times by the transmitter 12. The message 100 may be provided in any suitable format and may include a first signal portion 102 and a second signal portion 104. The first signal portion 102 may include a request for a function and may be provided at any suitable point of the message 100. In FIG. 4, the first signal portion 102 is provided at the beginning of the message 100 and prior to the second signal portion 104. Alternatively, the first signal portion 102 may be provided at an intermediate point or end of the message 100.

Referring to FIG. 5, a flowchart of a method for controlling a function according to one embodiment of the present invention is shown. As will be appreciated by one of ordinary skill in the art, the flowchart represents control logic which may be implemented using hardware, software, or a combination of hardware and software. The control logic may be implemented using any of a number of known programming or processing techniques or strategies and is not limited to the order or sequence illustrated. For instance, interrupt or event-driven processing may be employed in real-time control applications, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

Figure 6:
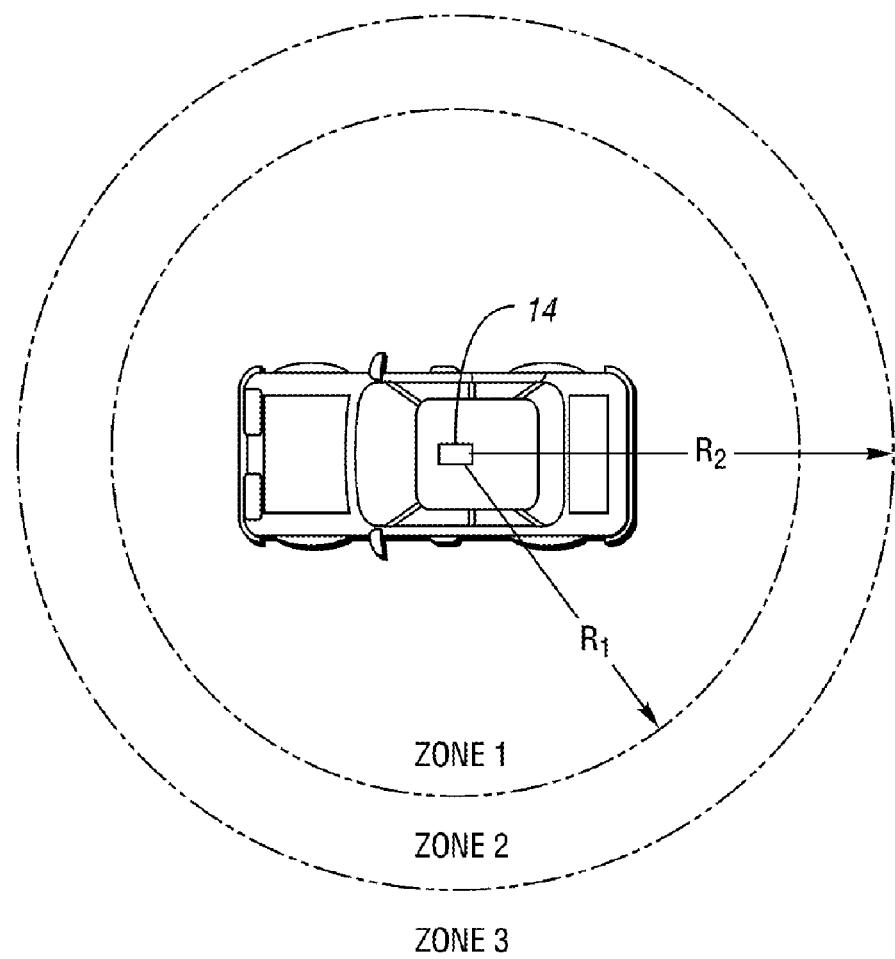
FIG. 6 is a graphical depiction of a plurality of zones associated with the control of a function.

The method may inhibit the execution of one or more functions based on the location of the transmitter 12 relative to the receiver 14. A graphical depiction of this concept is shown in FIG. 6. In FIG. 6, a plurality of zones are shown relative to a vehicle-mounted receiver 14. For simplicity, three zones (designated "zone 1", "zone 2" and "zone 3") are shown, although any suitable number of zones may be provided. The zone closest to the vehicle (zone 1) is located within a first predetermined distance (R1) from the receiver 14. The second zone (zone 2) is located within a second predetermined distance (R2) from the receiver 14. The third zone (zone 3) extends beyond the second predetermined distance and may be limited by the communication range of the system. A first set of functions may be enabled when the transmitter is within the first predetermined distance from the receiver (i.e., in zone 1) and disabled when the transmitter is outside zone 1 or vice versa. Likewise a second set of functions may be enabled when the transmitter is within the second predetermined distance from the receiver (i.e., in zone 1 or zone 2) and disabled when the receiver 14 is in zone 3 or vice versa. Similarly, a third set of functions may be enabled when the transmitter is in any zone. The first and second predetermined distances may be established at any suitable distance from the receiver. For instance, the first distance may be approximately 3 meters and the second predetermined distance may be approximately 20 meters.

At 100, the method may begin when execution of a function is requested. In an active system, execution of a function may be requested using the input device as previously described. In a passive system, execution of a function may be based on a change in position of the transmitter relative to the receiver.

At 102, a first signal portion is generated and transmitted. The first signal portion may be at least a portion of the wireless electronic signal or sequence of wireless electronic signals that form a complete function request. For example, the first signal portion may include encoded information that identifies the transmitter and the function or functions being requested. The first signal portion may be generated and transmitted using the transmitter as previously described.

At 104, the first signal portion may be received by the receiver via the first (high gain) antenna. Moreover, the first signal portion, if received, may be decoded using the receiver controller and/or another logical device in electronic communication with the receiver to identify the requested function.

At 106, the method determines whether the requested function is associated with the closest range (i.e., zone 1). A function associated with the closest range is a function that may be executed when the transmitter is within the first predetermined distance from the receiver. For example, one or more functions such as operating a convertible top may only be permitted when the transmitter is within zone 1. The determination as to whether a function is associated with the closest range may be accomplished in any suitable manner. For example, a lookup table may be used to store a list of functions and their associated range designations in a manner known by those skilled in the art. If the function request is indicative of function associated with the closest range (zone 1), then the method continues at block 108. If the function request is not indicative of a function associated with the closest range, then the method continues at block 110.

At 108, the third (very low gain) antenna is selected by the receiver controller via the third antenna control line. As such, the third antenna will be employed to receive a second signal portion at block 114 as will be described in more detail below.

At 110, the method determines whether the requested function is associated with the next closest range (i.e., zone 2). A function associated with the next closest range is a function that may be executed when the transmitter is within the second predetermined distance from the receiver. For example, one or more functions such as unlocking a vehicle closure, actuating a vehicle closure, or actuating a vehicle window may only be permitted when the transmitter is in zone 1 or zone 2. Of course, these functions are merely exemplary and may vary depending on design requirements. The determination as to whether a function is associated with the next closest range may be accomplished in any suitable manner. For example, a lookup table may be used to store a list of functions and their associated range designations in a manner known by those skilled in the art. If the function request is indicative of function associated with the next closest range, then the method continues at block 112. If the function request is not indicative of a function associated with the next closest range, then the function may be executed when the receiver is in any zone and the method continues at block 114. For example, functions that may be executed regardless of receiver location may include locking a closure, remote engine startup, activating internal and/or external vehicle lights, and/or activating an alarm system or "panic" function. Moreover, the method will continue to employ the first (high gain) antenna at block 114.

At 112, the second (low gain) antenna is selected by the receiver controller via the second antenna control line. As such, the second antenna will be employed to receive a second signal portion at block 114 as will be described in more detail below.

At 114, the selected antenna is used to receive and decode a second signal portion. The second signal portion may be successfully received with the first (high gain) antenna when the second signal portion is transmitted within any zone. The second signal portion may be successfully received with the second (low gain) antenna when the second signal portion is transmitted within zone 1 or zone 2. Similarly, the second signal portion may be successfully received and decoded with the third (very low gain) antenna when the second signal portion is transmitted within zone 1. The second signal portion may be decoded in any suitable manner, such as with the receiver controller and/or another logical device in electronic communication with the receiver.

At 116, the method determines if the second signal portion, if received, is properly or successfully decoded. The receiver controller and/or other logical device may determine if the control signal portion was successfully decoded. If the second signal portion is received and successfully decoded, then the transmitter is within an appropriate distance from the receiver and the function may be executed at block 118. If the second signal portion is not received or is not successfully decoded, then the transmitter is not within the an appropriate distance from the receiver and the function is not executed at block 120.

The present invention may allow one or more functions to be executed or inhibited based on frequency deviation and/or receiver sensitivity characteristics rather than by calculating the strength or power of a signal from the transmitter, thereby avoiding the complexities associated with determining the power of a signal. In addition, the present invention may allow execution of a function to be tailored to manufacture or customer requirements. For example, a controller may perform door lock and/or unlock functions when the transmitter is within a predetermined radius of the receiver. By performing a door lock/unlock function only when the remote transmitter is determined to be within a predetermined radius of the receiver, the method may reduce the likelihood that an operator may unintentionally lock/unlock a vehicle door from a far distance. Moreover, in at least one embodiment, the present invention may allow multi-range control of various devices using conventional remote keyless entry system components, thereby yielding little cost impact.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for remotely controlling a function, the system comprising:
   a transmitter for transmitting a wireless control signal having a first signal portion and a second signal portion, the first signal portion being indicative of a function request; and
   a receiver control circuit having a first antenna, a second antenna, and a controller for selectively enabling and disabling the first and second antennas and decoding the wireless control signal;
   wherein the first antenna receives the first signal portion; and
   wherein the controller enables the second antenna when the first signal portion is indicative of a function that is to be performed when the transmitter is within a first predetermined distance from the receiver, wherein determination of whether the transmitter is within the first predetermined distance from the receiver is not based on strength of the wireless control signal or a global positioning system, and wherein the function is performed when the second signal portion is received by the second antenna and successfully decoded.

2. The system of claim 1 wherein the controller enables the second antenna when the first signal portion is indicative of a function that is to be performed when the transmitter is within a second predetermined distance from the receiver and wherein the function is performed when the second signal portion is received by the second antenna and successfully decoded.

3. The system of claim 2 wherein the first predetermined distance is less than the second predetermined distance.

4. The system of claim 1 wherein the receiver control circuit further comprises a third antenna, and wherein the controller enables the third antenna when the first signal portion is not indicative of a function that is to be performed when the transmitter is within the second predetermined distance from the receiver, wherein the function is performed when the second signal portion is received by the first antenna and successfully decoded.

5. The system of claim 4 wherein the first antenna is a high gain antenna, the second antenna is a low gain antenna, and the third antenna is a very low gain antenna.

6. The system of claim 1 wherein the transmitter transmits the wireless control signal at a single power level.

7. The system of claim 1 wherein the receiver control circuit is disposed on a motor vehicle and the transmitter is a remote keyless entry fob.

8. The system of claim 7 wherein the remote keyless entry fob is an active remote keyless entry fob.

9. The system of claim 7 wherein the remote keyless entry fob is a passive remote keyless entry fob.

10. A method of controlling a function, the method comprising:
transmitting a wireless control signal with a transmitter, the wireless control signal having a first signal portion and a second signal portion;
receiving the first signal portion with a first antenna;
determining whether the first signal portion is indicative of a range-limited function;
enabling a second antenna without disconnecting the first antenna from a control circuit when the first signal portion is indicative of a range-limited function;
performing the range-limited function when the second signal portion is received by the second antenna and successfully decoded; and
enabling the third antenna and disabling the first and second antennas when the first signal portion is indicative of a second function that is to be performed when the transmitter is within a second predetermined distance from a receiver;
wherein the first antenna provides higher gain than the second antenna.

11. The method of claim 10 wherein the range-limited function is not performed when the second signal portion is not received by the second antenna or when the second signal portion is not properly decoded.

12. The method of claim 10 wherein the transmitter transmits the wireless control signal at a single power level.

13. The method of claim 10 wherein the transmitter is part of an active remote keyless entry fob.

14. The method of claim 10 wherein the transmitter is part of a passive remote keyless entry fob.

15. A method of controlling a vehicle function with a remote keyless entry system having a remote keyless entry fob having a transmitter and a vehicle-mounted receiver control circuit that includes first, second and third antennas, and a controller for selectively enabling and disabling the first, second and third antennas, the method comprising:
transmitting a wireless control signal having a first signal portion and a second signal portion with the transmitter;
receiving the first signal portion with the first antenna;
enabling the second antenna and disabling the first antenna when the first signal portion is indicative of a first function that is to be performed when the transmitter is within a first predetermined distance from the vehicle;
enabling the third antenna and disabling the first and second antennas when the first signal portion is indicative of a second function that is to be performed when the transmitter is within a second predetermined distance from the vehicle;
performing the first function when the second signal portion is received by the second antenna and successfully decoded;
wherein the first and second antennas are in continuous electrical communication with the controller.

16. The method of claim 15 wherein the vehicle-mounted receiver control circuit further comprises a third antenna that is selectively enabled and disabled by the controller and the method further comprises the steps of:
performing the second function when the second signal portion is received by the third antenna and successfully decoded;
wherein the third antenna provides lower gain than the second antenna.

17. The method of claim 15 further comprising disabling the second and third antennas when the first signal portion is not indicative of a first function that is to be performed when the transmitter is within a first predetermined distance from the vehicle or a second function that is to be performed when the transmitter is within a second predetermined distance from the vehicle.

18. The method of claim 15 wherein the first function includes at least one of locking a vehicle closure, closing a vehicle window, and starting a vehicle engine.

19. The method of claim 15 wherein the second function includes at least one of unlocking a vehicle closure and actuating a vehicle closure.

20. The method of claim 15 wherein the transmitter transmits the wireless control signal at a single power level.

* * * * *